(12) United States Patent
Huang et al.

(10) Patent No.: US 10,139,653 B2
(45) Date of Patent: Nov. 27, 2018

(54) CONVEX DISPLAY

(71) Applicant: GIANTPLUS TECHNOLOGY CO., LTD, Miaoli County (TW)

(72) Inventors: Chih-Teng Huang, Taoyuan (TW); Hsin-Yu Han, Taoyuan (TW); He-Guei Chen, New Taipei (TW); Hsiao-Ching Shen, Taoyuan (TW)

(73) Assignee: GIANTPLUS TECHNOLOGY CO., LTD., Miaoli County (TW)

( * ) Notice: Subject to any disclaimer, the term of this patent is extended or adjusted under 35 U.S.C. 154(b) by 0 days.

(21) Appl. No.: 15/700,189

(22) Filed: Sep. 11, 2017

(65) Prior Publication Data

US 2018/0173019 A1 Jun. 21, 2018

(30) Foreign Application Priority Data

Dec. 15, 2016 (TW) .............................. 105219082 U

(51) Int. Cl.
*G02B 5/20* (2006.01)
*G02F 1/01* (2006.01)
*G02F 1/19* (2006.01)
*G02F 1/1335* (2006.01)

(52) U.S. Cl.
CPC ............. *G02F 1/0102* (2013.01); *G02B 5/20* (2013.01); *G02F 1/133524* (2013.01); *G02F 1/19* (2013.01)

(58) Field of Classification Search
CPC .... G02F 1/0102; G02F 1/133524; G02F 1/19; G02B 5/20
See application file for complete search history.

(56) References Cited

U.S. PATENT DOCUMENTS

| | | | | |
|---|---|---|---|---|
| 8,128,257 | B2 * | 3/2012 | Wood ................ | G02F 1/133504 349/67 |
| 2004/0218133 | A1 * | 11/2004 | Park ................... | G02F 1/133305 349/153 |
| 2006/0187366 | A1 * | 8/2006 | Sugimoto ............... | G02B 1/04 349/10 |
| 2012/0099323 | A1 * | 4/2012 | Thompson .......... | H01L 51/5275 362/257 |
| 2012/0275139 | A1 * | 11/2012 | Chen .................... | G02B 6/0025 362/97.2 |
| 2014/0063719 | A1 | 3/2014 | Yamazaki et al. | |

(Continued)

FOREIGN PATENT DOCUMENTS

TW I379261 12/2012

*Primary Examiner* — Lucy P Chien
(74) *Attorney, Agent, or Firm* — JCIPRNET

(57) ABSTRACT

A convex display including a first substrate, a second substrate, a display medium, a color filter layer, an optical film and an active device layer is provided. The second substrate is disposed opposite to the first substrate. The display medium is disposed between the first substrate and the second substrate. The color filter layer is disposed on the first substrate. The active device layer is disposed on the first substrate or the second substrate. The optical film is disposed on the first substrate. The optical film is farther away from the display medium than the color filter. The optical film includes a base material and optical microstructures embedded in the base material, wherein a refractive index of each of the optical microstructures is larger than a refractive index of the base material.

11 Claims, 5 Drawing Sheets

(56) References Cited

U.S. PATENT DOCUMENTS

2014/0185304 A1* 7/2014 Hsiao ................ B29D 11/0073
362/330
2015/0029747 A1* 1/2015 Hsieh .................. G02B 6/0055
362/607
2017/0031086 A1* 2/2017 Lai ....................... G02B 6/0053

* cited by examiner

CONVEX DISPLAY

CROSS-REFERENCE TO RELATED APPLICATION

This application claims the priority benefit of Taiwan application serial no. 105219082, filed on Dec. 15, 2016. The entirety of the above-mentioned patent application is hereby incorporated by reference herein and made a part of this specification.

BACKGROUND OF THE INVENTION

Field of the Invention

The invention relates to a display, and particularly relates to a convex display.

Description of Related Art

With the advance of technology, applications of curved displays have become more and more extensive. For example, curved displays have been widely applied to wearable devices, mobile phones, televisions and etc. Devices that are often used in daily life may all be installed with curved displays, indicating the great market potential of such kind of displays. The curved displays include convex displays and concave displays. The display surface of the convex display protrudes towards the user, whereas the display surface of the concave display is recessed away from the user. However, in the conventional convex display, a light emitted from the convex display diverges toward two sides and causes problems such as color mixing, rainbow stripes and display brightness unevenness, thereby resulting in the downgrade of the convex display.

SUMMARY OF THE INVENTION

The invention provides a convex display that has good performance.

The convex display of the invention includes a first substrate, a second substrate, a display medium, a color filter layer, an optical film, and an active device layer. The second substrate is disposed opposite to the first substrate. The display medium is disposed between the first substrate and the second substrate. The color filter layer is disposed on the first substrate. The active device layer is disposed on the first substrate or the second substrate. The optical film is disposed on the first substrate, and the optical film is farther away from the display medium than the color filter layer. The optical film includes a base material and a plurality of optical microstructures embedded in the base material, where a refractive index of each of the plurality of optical microstructures is larger than a refractive index of the base material.

In an embodiment of the invention, at least a part of the plurality of optical microstructures are not parallel to each other.

In an embodiment of the invention, the first substrate has a first convex surface. The first convex surface has a first vertex and has a first edge and a second edge respectively located at two opposite sides of the first vertex. The plurality of optical microstructures include a plurality of first optical microstructures and a plurality of second optical microstructures. The plurality of first optical microstructures are located between the first edge and the first vertex and inclined from the first edge toward the first vertex. The plurality of second optical microstructures are located between the second edge and the first vertex and inclined from the second edge toward the first vertex.

In an embodiment of the invention, the second substrate, the display medium and the first substrate are sequentially stacked in a first direction. Each of the first optical microstructures and the first direction include an angle $\alpha 1$. The angle $\alpha 1$ is increased as the first optical microstructure is away from the first vertex. Each of the second optical microstructures and the first direction include an angle $\alpha 2$. The angle $\alpha 2$ is increased as the second optical microstructure is away from the first vertex.

In an embodiment of the invention, the second substrate, the display medium and the first substrate are sequentially stacked in a first direction, and the plurality of optical microstructures further include a plurality of third optical microstructures. The plurality of third optical microstructures are located in a region where the first vertex is located, and each of the plurality of third optical microstructures is substantially perpendicular to the first convex surface.

In an embodiment of the invention, the first substrate has a first convex surface, the first convex surface has a first vertex, and a distribution density of the plurality of optical microstructures in a region away from the first vertex is greater than a distribution density of the plurality of optical microstructures in a region close to the first vertex.

In an embodiment of the invention, the convex display further includes a reflective layer. The reflective layer is disposed on the second substrate and includes a plurality of reflective microstructures. The plurality of reflective microstructures respectively have a plurality of reflective surfaces, and at least a part of the plurality of reflective surfaces are inclined relative to the second substrate.

In an embodiment of the invention, the second substrate, the display medium and the first substrate are sequentially stacked in a first direction. The second substrate has a second convex surface. The second convex surface has a second vertex and has a third edge and a fourth edge respectively located at two opposite sides of the second vertex. The plurality of reflective microstructures include a plurality of first reflective microstructures and a plurality of second reflective microstructures. The plurality of first reflective microstructures are located between the third edge and the second vertex. Each of the plurality of first reflective microstructures has a first reflective surface, and the first reflective surface faces towards a center of the convex display. The plurality of second reflective microstructures are located between the fourth edge and the second vertex. Each of the plurality of second reflective microstructures has a second reflective surface, and the second reflective surface faces towards the center of the convex display.

In an embodiment of the invention, the first reflective surface and the second substrate include an angle $\beta 1$, and the angle $\beta 1$ is increased as the first reflective microstructure is away from the second vertex. The second reflective surface and the second substrate include an angle $\beta 2$, and the angle $\beta 2$ is increased as the second reflective microstructure is away from the second vertex. In an embodiment of the invention, the plurality of reflective microstructures further include a plurality of third reflective microstructures. The plurality of third reflective microstructures are located in a region where the second vertex is located. Each of the plurality of third reflective microstructures has a third reflective surface, and the third reflective surface is substantially parallel to the second substrate.

In an embodiment of the invention, a distribution density of the plurality of reflective microstructures in a region away from the second vertex is greater than a distribution density of the plurality of reflective microstructures in a region close to the second vertex.

Based on the above description, the convex display of an embodiment of the invention includes the optical film. The optical film includes the base material and the plurality of optical microstructures embedded in the base material respectively, where the refractive index of each of the optical microstructures is larger than the refractive index of the base material. When a light emitting from the display medium of the convex display passes through the optical film, the light is deflected by the optical film so that the light originally diverging toward two sides of the convex display is adjusted to be concentrated to the center of the display panel. In this way, the problems of the conventional technique such as color mixing, rainbow stripes, display brightness unevenness, etc., can be mitigated.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
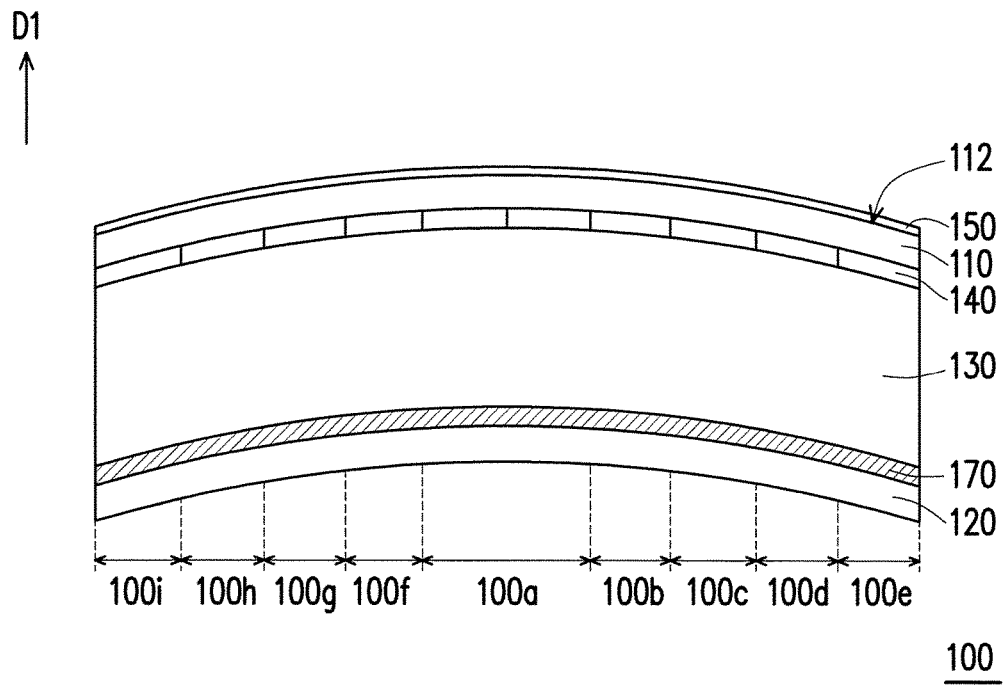
FIG. 1A is a schematic sectional view of a convex display according to an embodiment of the invention.
Figure 1B:
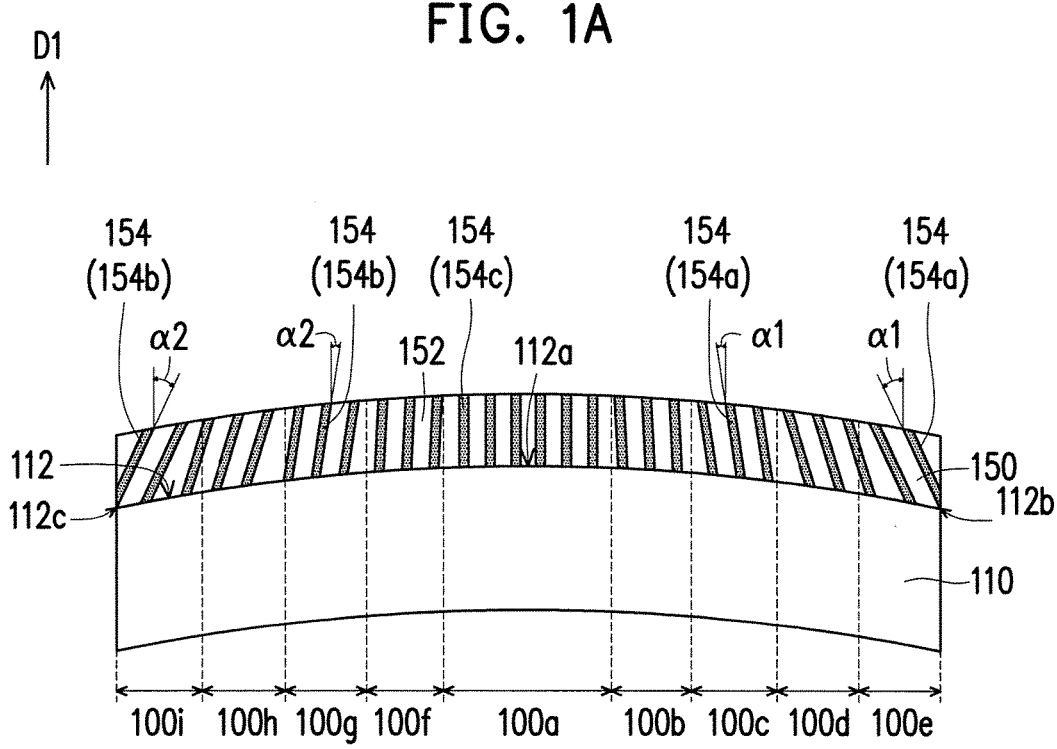
FIG. 1B is a schematic sectional view of a first substrate and an optical film of the convex display of FIG. 1A.

FIG. 1A is a schematic sectional view of a convex display according to an embodiment of the invention. FIG. 1B is a schematic sectional view of a first substrate and an optical film of the convex display of FIG. 1A.

With reference to FIG. 1A and FIG. 1B, a convex display 100 includes a first substrate 110, a second substrate 120, a display medium 130, a color filter layer 140, an optical film 150, and an active device layer 170. The second substrate 120 is disposed opposite to the first substrate 110. The display medium 130 is disposed between the first substrate 110 and the second substrate 120. The color filter layer 140 is disposed on the first substrate 110. The optical film 150 is disposed on the first substrate 110, and is farther away from the display medium 130 than the color filter layer 140. The optical film 150 includes a base material 152 and a plurality of optical microstructures 154 embedded in the base material 152 respectively, where a refractive index of each of the optical microstructures 154 is larger than a refractive index of the base material 152. In this embodiment, the display medium 130 is, for example, a liquid crystal, but the invention is not limited thereto, and in other embodiments, the display medium 130 may also be other suitable materials, such as an organic electroluminescent layer.

In this embodiment, the active device layer 170 is selectively disposed on the second substrate 120, and is located between the second substrate 120 and the display medium 130. But the invention is not limited thereto, and in other embodiments, the active device layer 170 may also be disposed on the first substrate 110. Such examples are provided in juxtaposition with other drawings in subsequent paragraphs. For example, in this embodiment, the active device layer 170 includes a plurality of thin-film transistors (TFTs, not shown), a plurality of scan lines electrically connected to gates of the TFTs, a plurality of data lines electrically connected to sources of the TFTs, and a plurality of pixel electrodes electrically connected to drains of the TFTs. However, the invention is not limited thereto, and in other embodiments, the active device layer 170 may also include other suitable components.

With reference to FIG. 1A, the optical film 150 is located at an outer side of the first substrate 110, and the color filter layer 140 is located at an inner side of the first substrate 110. In other words, the first substrate 110, the second substrate 120 and the display medium 130 form a cell, and in this embodiment, the optical film 150 is located outside the cell. However, the invention is not limited thereto, and in other embodiments, the optical film 150 may also be located at the inner side of the first substrate 110. To be specific, the optical film 150 may also be located between the first substrate 110 and the color filter layer 140. That is to say, in other embodiments, the optical film 150 may also be located within the cell.

With reference to FIG. 1B, in this embodiment, the optical film 150 includes a plurality of optical microstructures 154. The optical microstructures 154 are arranged on a first convex surface 112 of the first substrate 110. At least a part of the optical microstructures 154 are not parallel to each other. To be specific, the optical microstructures 154 include a plurality of first optical microstructures 154a, a plurality of second optical microstructures 154b, and a plurality of optical microstructures 154c. The first substrate 110 has the first convex surface 112. The first convex surface 112 has a first vertex 112a and has a first edge 112b and a second edge 112c respectively located at two opposite sides of the first vertex 112a. The first optical microstructures 154a are located between the first edge 112b and the first vertex 112a and are inclined from the first edge 112b toward the first vertex 112a. In other words, the second substrate 120, the display medium 130 and the first substrate 110 are sequentially stacked in a first direction D1, and the first optical microstructures 154a are inclined towards the first vertex 112a. The second optical microstructures 154b are located between the second edge 112c and the first vertex 112a and are inclined from the second edge 112c toward the first vertex 112a. In other words, the second optical microstructures 154b are inclined towards the first vertex 112a, and an inclination direction of the second optical microstructures 154b is opposite to an inclination direction of the first optical microstructures 154a. The third optical microstructures 154c are located in a region 100a where the first vertex 112a is located. The third optical microstructures 154c are substantially perpendicular to the first convex surface 112 of the first substrate 110.

Furthermore, in this embodiment, each of the first optical microstructures 154a and the first direction D1 include an angle α1, the angle α1 is increased as the first optical microstructure 154a is away from the first vertex 112a. Each of the second optical microstructures 154b and the first direction D1 include an angle α2, and the angle α2 is increased as the second optical microstructure 154b is away from the first vertex 112a. In other words, the farther the optical microstructure 154 is away from the center of the convex display 100, the greater an inclination degree of the optical microstructure 154.

Figure 2:
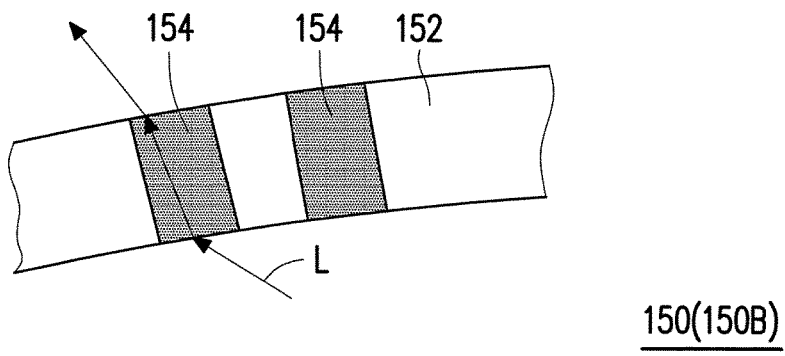
FIG. 2 is a schematic sectional view of a portion of an optical film according to an embodiment of the invention.

FIG. 2 is a schematic sectional view of a portion of an optical film according to an embodiment of the invention. It should be noted that FIG. 2 is a schematic enlarged view of the optical film according to an embodiment of the invention. In detail, FIG. 2 is a schematic enlarged view of a part of the optical film 150 in regions 100i-100f of FIG. 1B. Besides, the dimension scale of each component in FIG. 2 is only schematic and is not intended to limit the invention. With reference to FIG. 1A, FIG. 1B and FIG. 2, when a light L coming from the first substrate 110 passes through the optical film 150, the light L is deflected by the optical film 150 so that the light L originally diverging to two sides is adjusted to be concentrated to the center of the display panel 100. In this way, the problems of the conventional technique such as color mixing, rainbow stripes, display brightness unevenness, etc., can be mitigated.

Figure 3:
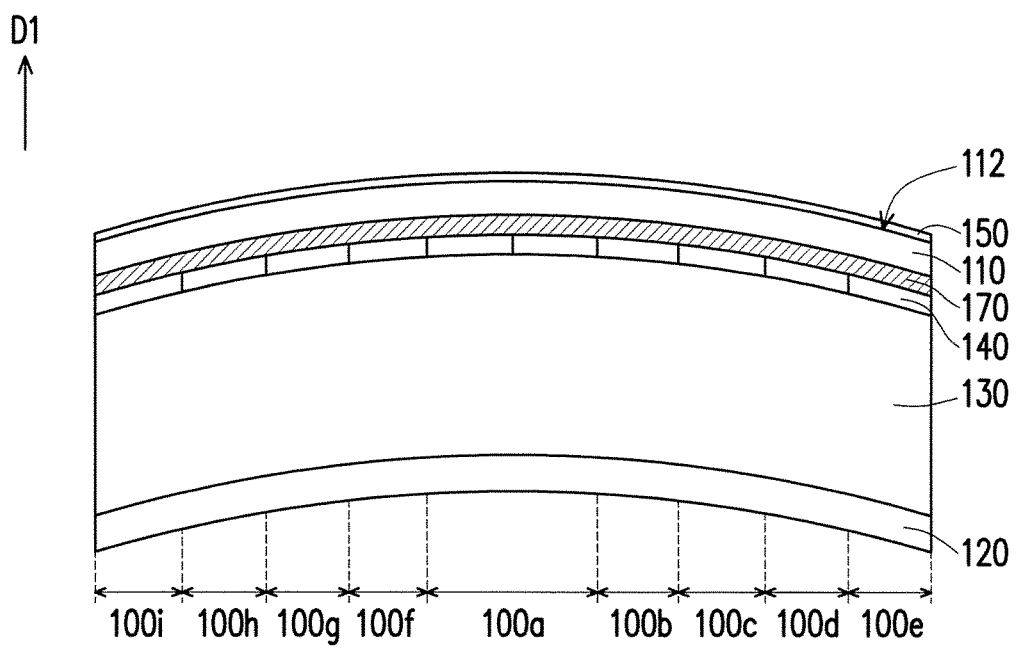
FIG. 3 is a schematic sectional view of a convex display according to another embodiment of the invention.

FIG. 3 is a schematic sectional view of a convex display according to another embodiment of the invention. The convex display 100A of FIG. 3 is similar to the convex display 100 of FIG. 1A so that the same or corresponding components are denoted by the same or corresponding referential numerals. The difference between the convex display 100A and the convex display 100 is that the position of the active device layer 170 of the convex display 100A is different from the position of the active device layer 170 of the convex display 100. The following sections mainly explicate this difference. As for the same parts of the two convex displays, please refer to the aforementioned description, and details thereof are not repeated here.

With reference to FIG. 3, the convex display 100A includes a first substrate 110, a second substrate 120, a display medium 130, a color filter layer 140, an optical film 150, and an active device layer 170. The second substrate 120 is disposed opposite to the first substrate 110. The display medium 130 is disposed between the first substrate 110 and the second substrate 120. The color filter layer 140 is disposed on the first substrate 110. The optical film 150 is disposed on the first substrate 110, and is farther away from the display medium 130 than the color filter layer 140. The optical film 150 includes a base material 152 and a plurality of optical microstructures 154 embedded in the base material 152 respectively, where a refractive index of each of the optical microstructures 154 is larger than a refractive index of the base material 152. Different from the convex display 100, here the active device layer 170 is disposed on the first substrate 110 instead of on the second substrate 120. In other words, in this embodiment, the active device layer 170 and the color filter layer 140 may be disposed on the same substrate to form a structure of color filter on array (COA). The convex display 100A has similar effects and advantages as the convex display 100, so the details thereof are not repeated here.

Figure 4A:
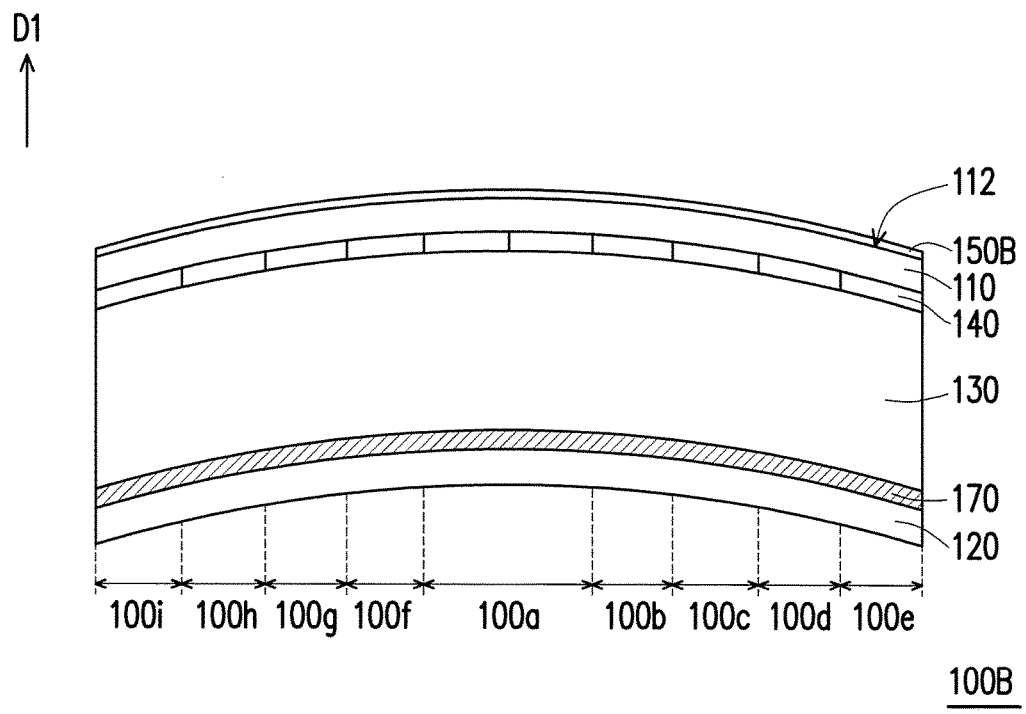
FIG. 4A is a schematic sectional view of a convex display according to still another embodiment of the invention.
Figure 4B:
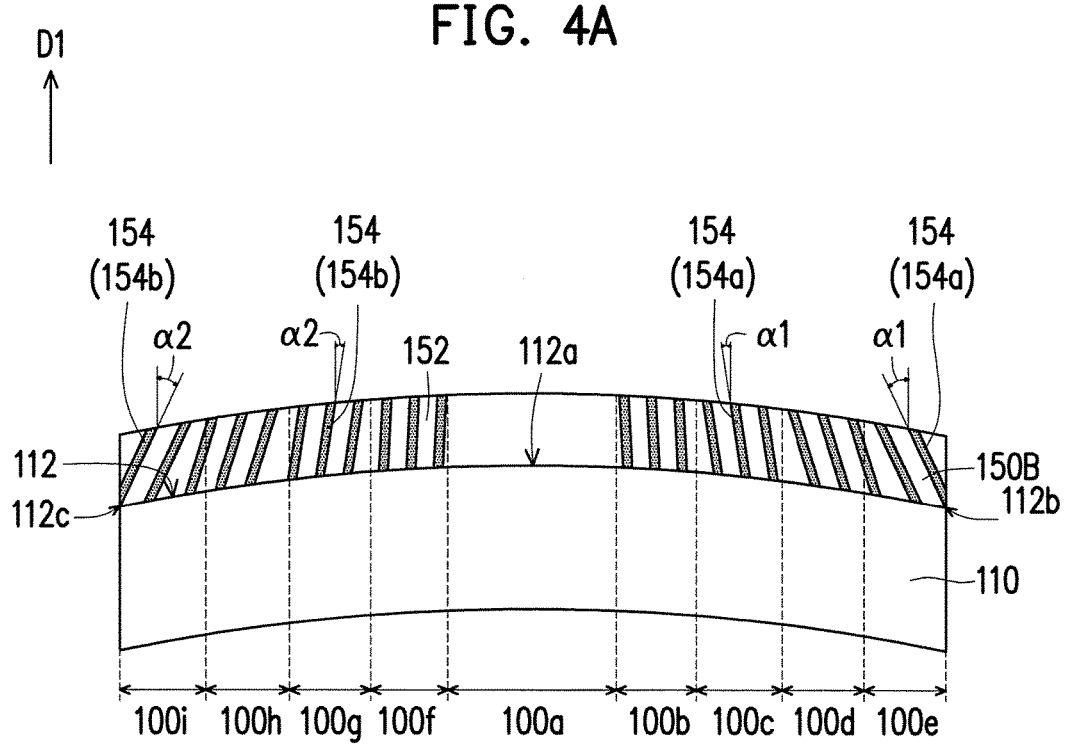
FIG. 4B is a schematic sectional view of a first substrate and an optical film of the convex display of FIG. 4A.

FIG. 4A is a schematic sectional view of a convex display according to still another embodiment of the invention. FIG. 4B is a schematic sectional view of a first substrate and an optical film of the convex display of FIG. 4A. The convex display 100B of FIG. 4A is similar to the convex display 100 of FIG. 1A so that the same or corresponding components are denoted by the same or corresponding referential numerals. The difference between the convex display 100B and the convex display 100 is that the optical film 150B of the convex display 100B is different from the optical film 150 of the convex display 100. The following sections mainly explicate this difference. As for the same parts of the two convex displays, please refer to the aforementioned description, and details thereof are not repeated here.

With reference to FIG. 4A and FIG. 4B, the convex display 100B includes a first substrate 110, a second substrate 120, a display medium 130, a color filter layer 140, an optical film 150B, and an active device layer 170. The second substrate 120 is disposed opposite to the first substrate 110. The display medium 130 is disposed between the first substrate 110 and the second substrate 120. The color filter layer 140 is disposed on the first substrate 110. The optical film 150B is disposed on the first substrate 110, and is farther away from the display medium 130 than the color filter layer 140. The optical film 150B includes a base material 152 and a plurality of optical microstructures 154 embedded in the base material 152 respectively, where a refractive index of each of the optical microstructures 154 is larger than a refractive index of the base material 152. The active device layer 170 is disposed on the second substrate 120.

Different from the convex display 100, here a distribution density of the optical microstructures 154 in regions 100b-100e away from a first vertex 112a is greater than a distribution density of the optical microstructures 154 in a region 100a close to the first vertex 112a, and a distribution density of the optical microstructures 154 in regions 100f-100i away from the first vertex 112a is greater than the distribution density of the optical microstructures 154 in the region 100a close to the first vertex 112a. In other words, the closer the region is to the edge of the convex display 100B, the higher the distribution density of the optical microstructures 154 in the region, and the closer the region is to the center of the convex display 100B, the lower the distribution density of the optical microstructures 154 in the region. In one embodiment, none of the optical microstructures 154 is disposed in the region 100a close to the first vertex 112a.

Figure 5A:
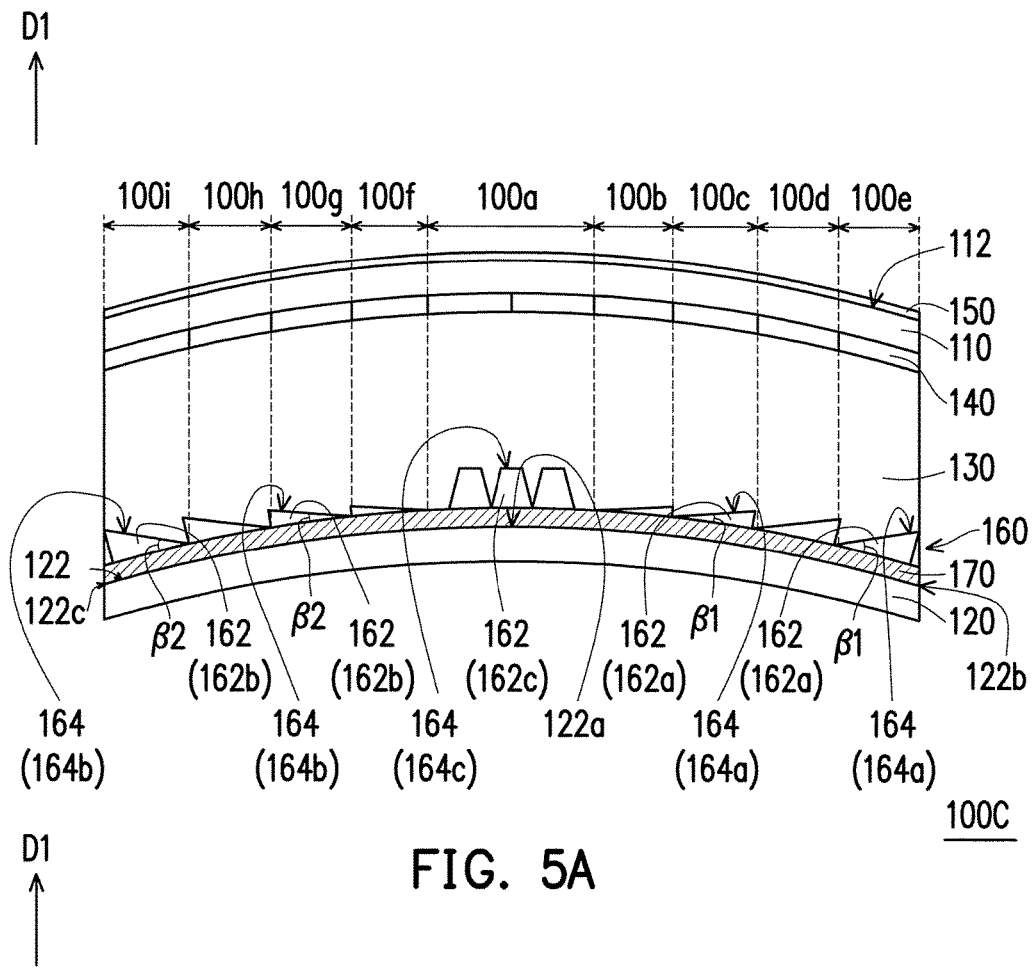
FIG. 5A is a schematic sectional view of a convex display according to still another embodiment of the invention.
Figure 5B:
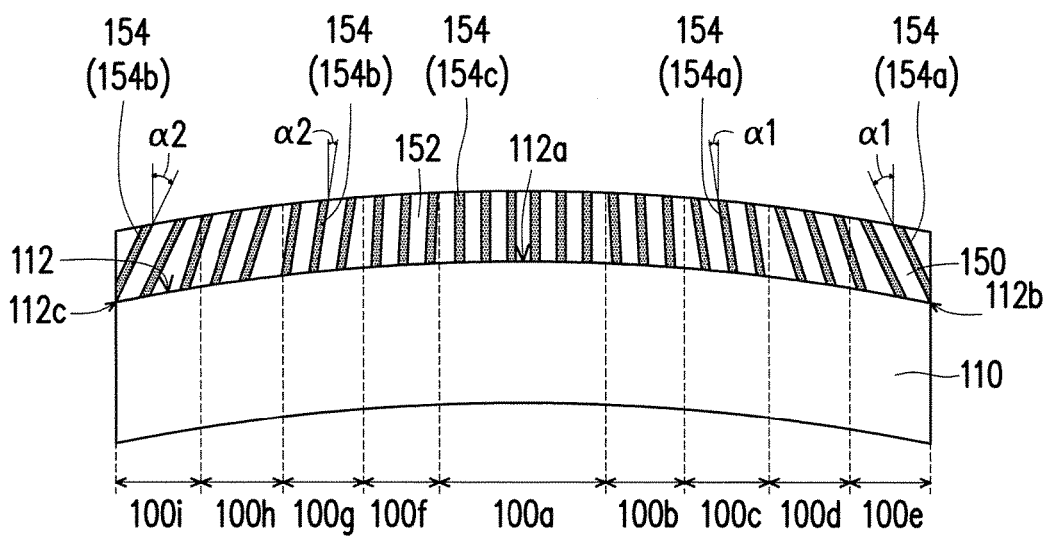
FIG. 5B is a schematic sectional view of a first substrate and an optical film of the convex display of FIG. 5A.

FIG. 5A is a schematic sectional view of a convex display according to another embodiment of the invention. FIG. 5B is a schematic sectional view of a first substrate and an optical film of the convex display of FIG. 5A. The convex display 100C of FIG. 5A is similar to the convex display 100 of FIG. 1A so that the same or corresponding components are denoted by the same or corresponding referential numerals. The difference between the convex display 100C and the convex display 100 is that the convex display 100C further includes a reflective layer 160 disposed on the second substrate 120. The following sections mainly explicate this difference. As for the same parts of the two convex displays, please refer to the aforementioned description, and details thereof are not repeated here.

With reference to FIG. 5A and FIG. 5B, the convex display 100C includes a first substrate 110, a second substrate 120, a display medium 130, a color filter layer 140, an optical film 150, and an active device layer 170. The second substrate 120 is disposed opposite to the first substrate 110. The display medium 130 is disposed between the first substrate 110 and the second substrate 120. The color filter layer 140 is disposed on the first substrate 110. The optical film 150 is disposed on the first substrate 110, and is farther away from the display medium 130 than the color filter layer 140. The optical film 150 includes a base material 152 and a plurality of optical microstructures 154 embedded in the base material 152 respectively, where a refractive index of each of the optical microstructures 154 is larger than a refractive index of the base material 152. The active device layer 170 is disposed on the second substrate 120.

Different from the convex display 100, the convex display 100C further includes a reflective layer 160 disposed on the second substrate 120. The reflective layer 160 includes a plurality of reflective microstructures 162. The reflective microstructures 162 respectively have a plurality of reflective surfaces 164. At least a part of the reflective surfaces 164 are inclined relative to the second substrate 120. In detail, the second substrate 120 has a second convex surface 122 while the second convex surface 122 has a second vertex 122a and has a third edge 122b and a fourth edge 122c respectively located at two opposite sides of the second vertex 122a. The reflective microstructures 162 include a plurality of first reflective microstructures 162a and a plurality of second reflective microstructures 162b. The first reflective microstructures 162a are located between the third edge 122b and the second vertex 122a, and the second reflective microstructures 162b are located between the fourth edge 122c and the second vertex 122a. Each of the first reflective microstructures 162a has a first reflective surface 164a, each of the second reflective microstructures 162b has a second reflective surface 164b, and the first reflective surfaces 164a and the second reflective surfaces 164b are inclined relative to the second substrate 120. Furthermore, the first reflective surface 164a of the first reflective microstructure 162a inclines and faces towards the center of the convex display 100C, and the second reflective surface 164b of the second reflective microstructure 162b inclines and faces towards the center of the convex display 100C, where an inclination direction of the first reflective surface 164a is opposite to an inclination direction of the second reflective surface 164b.

With reference to FIG. 5A and FIG. 5B, in this embodiment, the first reflective surface 164a and the second substrate 120 include an angle β1, and the angle β1 is increased as the first reflective microstructure 162a is away from the second vertex 122a. In other words, the farther the first reflective microstructure 162a is away from the center of the convex display 100C, the greater an inclination degree of the first reflective surface 164a is. The second reflective surface 164b and the second substrate 120 include an angle β2, and the angle β2 is increased as the second reflective microstructure 162b is away from the second vertex 122a. In other words, the farther the second reflective microstructure 162b is away from the center of the convex display 100C, the greater an inclination degree of the second reflective surface 164b is. Moreover, in this embodiment, the reflective microstructures 162 further include a plurality of third reflective microstructures 162c. The third reflective microstructures 162c are located in a region 100a where the second vertex 122a is located. Each of the third reflective microstructures 162c has a third reflective surface 164c, and the third reflective surface 164c is substantially parallel to the second substrate 120.

In this embodiment, the reflective microstructures 162 and the optical microstructures 154 correspond to each other. To be specific, the reflective microstructures 162 located in the region 100a correspond to the optical microstructures 154 located in the same region 100a; the reflective microstructures 162 located in the region 100b correspond to the optical microstructures 154 located in the same region 100b; the reflective microstructures 162 located in the region 100c correspond to the optical microstructures 154 located in the same region 100c; the reflective microstructures 162 located in the region 100d correspond to the optical microstructures 154 located in the same region 100d; the reflective microstructures 162 located in the region 100e correspond to the optical microstructures 154 located in the same region 100e; the reflective microstructures 162 located in the region 100f correspond to the optical microstructures 154 located in the same region 100f; the reflective microstructures 162 located in the region 100g correspond to the optical microstructures 154 located in the same region 100g; the reflective microstructures 162 located in the region 100h correspond to the optical microstructures 154 located in the same region 100h; and the reflective microstructures 162 located in the region 100i correspond to the optical microstructures 154 located in the same region 100i. In brief, the first reflective microstructure 162a with a larger angle β1 corresponds to the first optical microstructure 154a with a larger angle α1, the second reflective microstructure 162b with a larger angle β2 corresponds to the second optical microstructure 154b with a larger angle α2, and the third optical microstructure 154c parallel to the first direction D1 corresponds to the third reflective microstructure 162c that has the third reflective surface 164c parallel to the second substrate 120.

The active device layer 170 includes a plurality of TFTs (not shown), a plurality of scan lines (not shown) electrically connected to gates of the TFTs, and a plurality of data lines (not shown) electrically connected to sources of the TFTs. In this embodiment, the reflective microstructures 162 are conductive and are electrically connected to drains of the TFTs. In other words, in this embodiment, the reflective microstructures 162 may function as pixel electrodes. However, the invention is not limited thereto, and in other embodiments, the reflective microstructures 162 may also be independently disposed outside the pixel electrodes.

It should be noted that in this embodiment, the light coming from the outside is reflected by the reflective microstructures 162 to be transmitted to the optical film 150 in a suitable direction. In collaboration with a reflection function of the reflective microstructures 162 and a deflection function of the optical film 150, the transmission direction of the light passing through the optical film 150 may further approach the direction parallel to the user's line of sight (for example, a direction overlapping with the first direction D1). In this way, the problems of the conventional technique such as color mixing, rainbow stripes, display brightness unevenness, etc., can be mitigated.

Figure 6A:
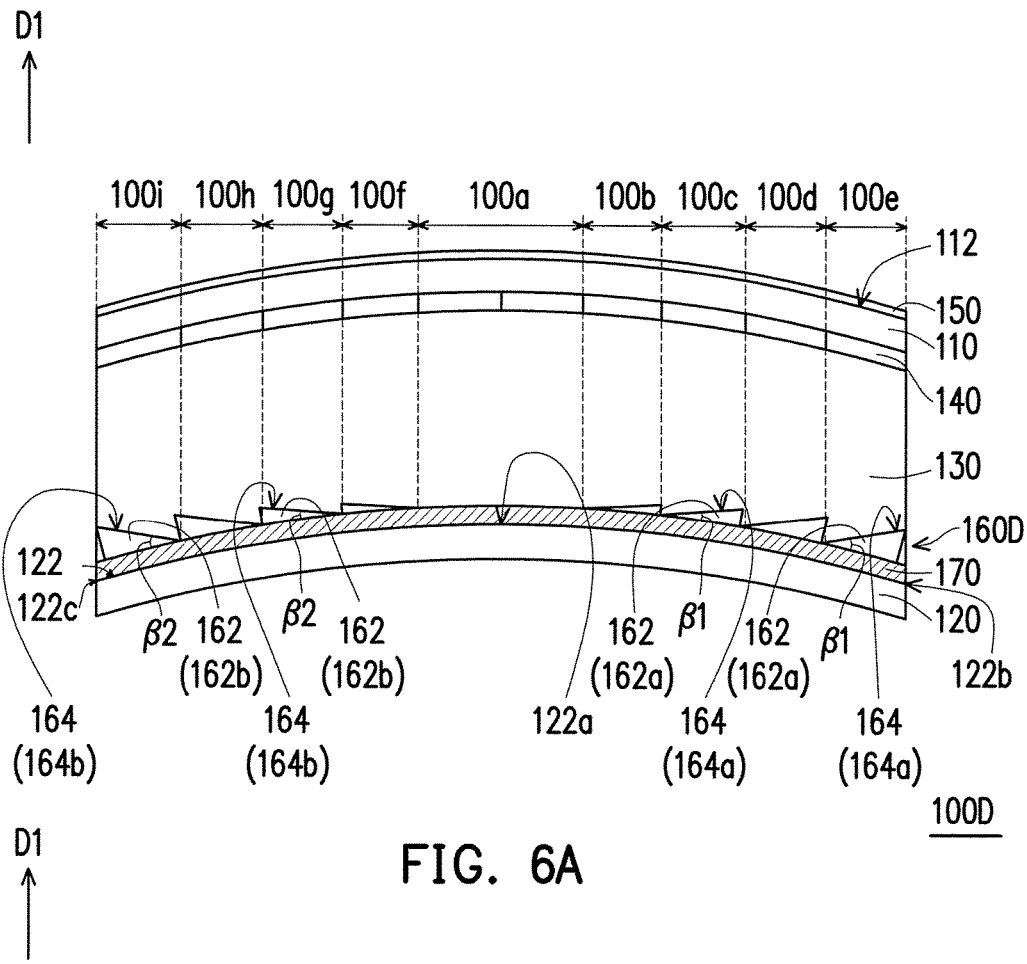
FIG. 6A is a schematic sectional view of a convex display according to still another embodiment of the invention.
Figure 6B:
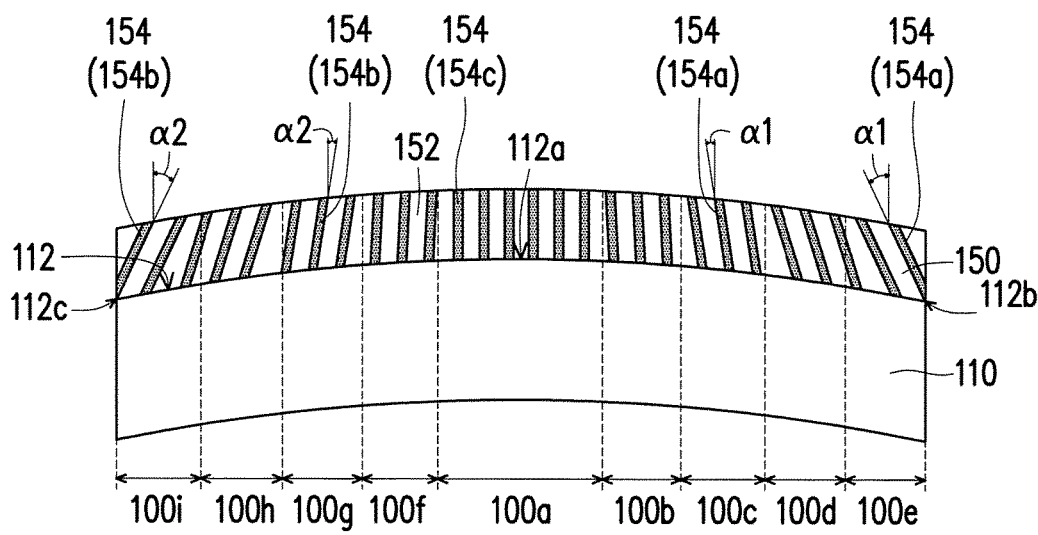
FIG. 6B is a schematic sectional view of a first substrate and an optical film of the convex display of FIG. 6A.

FIG. 6A is a schematic sectional view of a convex display according to still another embodiment of the invention. FIG. 6B is a schematic sectional view of a first substrate and an optical film of the convex display of FIG. 6A. The convex display 100D of FIG. 6A is similar to the convex display 100C of FIG. 5A so that the same or corresponding components are denoted by the same or corresponding referential numerals. The difference between the convex display 100D and the convex display 100C is that the reflective layer 160D of the convex display 100D is different from the reflective layer 160 of the convex display 100C. The following sections mainly explicate this difference. As for the same parts of the two convex displays, please refer to the aforementioned description, and details thereof are not repeated here.

With reference to FIG. 6A and FIG. 6B, the convex display 100D includes a first substrate 110, a second substrate 120, a display medium 130, a color filter layer 140, an optical film 150, and an active device layer 170. The second substrate 120 is disposed opposite to the first substrate 110. The display medium 130 is disposed between the first substrate 110 and the second substrate 120. The color filter layer 140 is disposed on the first substrate 110. The optical film 150 is disposed on the first substrate 110, and is farther away from the display medium 130 than the color filter layer 140. The optical film 150 includes a base material 152 and a plurality of optical microstructures 154 embedded in the base material 152 respectively, where a refractive index of each of the optical microstructures 154 is larger than a refractive index of the base material 152. The active device layer 170 is disposed on the second substrate 120.

In this embodiment, a distribution density of the reflective microstructures 162 in regions 100b-100e away from a second vertex 122a is greater than a distribution density of the reflective microstructures 162 in a region 100a close to the second vertex 122a, and a distribution density of the reflective microstructures 162 in regions 100f-100i away from the second vertex 122a is greater than a distribution density of the reflective microstructures 162 in the region 100a close to the second vertex 122a. In other words, the closer the region is to the edge of the convex display 100D, the higher the distribution density of the reflective microstructures 162 in the region, and the closer the region is to the center of the convex display 100D, the lower the distribution density of the reflective microstructures 162 in the region. In one embodiment, none of the reflective microstructures 162 is disposed in the region 100a close to the second vertex 122a. The convex display 100D has similar effects and advantages as the convex display 100C, so the details thereof are not repeated here.

In summary, the convex display of an embodiment of the invention includes the optical film. The optical film includes the base material and the plurality of optical microstructures embedded in the base material respectively, where the refractive index of each of the optical microstructures is larger than the refractive index of the base material. When a light coming from the display medium passes through the optical film, the light is deflected by the optical film so that the light originally diverging to two sides of the convex display is adjusted to be concentrated to the center of the display panel. In this way, the problems of the conventional technique such as color mixing, rainbow stripes, display brightness unevenness, etc., can be mitigated.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A convex display, comprising:
   a first substrate;
   a second substrate disposed opposite to the first substrate;
   a display medium disposed between the first substrate and the second substrate;
   a color filter layer disposed on the first substrate;
   an optical film disposed on the first substrate and located farther away from the display medium than the color filter layer, the optical film comprising:
      a base material; and
      a plurality of optical microstructures embedded in the base material respectively, wherein a refractive index of each of the plurality of optical microstructures is larger than a refractive index of the base material, and at least a part of the plurality of optical microstructures are not parallel to each other; and
   an active device layer disposed on the first substrate or the second substrate, wherein the first substrate has a first convex surface, the first substrate is disposed between the optical film and the color filter layer, the optical film is disposed on the first convex surface of the first substrate; the first convex surface has a first vertex and has a first edge and a second edge respectively located at two opposite sides of the first vertex, and the plurality of optical microstructures comprise:
      a plurality of first optical microstructures, located between the first edge and the first vertex and inclined from the first edge toward the first vertex; and
      a plurality of second optical microstructures, located between the second edge and the first vertex and inclined from the second edge toward the first vertex, a light emitted from the display medium is refracted by the plurality of first optical microstructures and the plurality of second optical microstructures.

2. The convex display as recited in claim 1, wherein the second substrate, the display medium and the first substrate are sequentially stacked in a first direction, each of the first optical microstructures and the first direction include an angle α1, the angle α1 is increased as the first optical microstructure is away from the first vertex, each of the second optical microstructures and the first direction include an angle α2, and the angle α2 is increased as the second optical microstructure is away from the first vertex.

3. The convex display as recited in claim 1, wherein the second substrate, the display medium and the first substrate are sequentially stacked in a first direction, and the plurality of optical microstructures further comprise:
   a plurality of third optical microstructures located in a region where the first vertex is located, wherein each of the plurality of third optical microstructures is substantially perpendicular to the first convex surface.

4. The convex display as recited in claim 1, wherein the first substrate has a first convex surface, the first convex surface has a first vertex, and a distribution density of the plurality of optical microstructures in a region away from the first vertex is greater than a distribution density of the plurality of optical microstructures in a region close to the first vertex.

5. The convex display as recited in claim 1, wherein the first substrate has a first convex surface, the first convex surface has a first vertex, and the plurality of optical microstructures are not disposed in a region close to the first vertex.

6. The convex display as recited in claim 1, further comprising:
   a reflective layer disposed on the second substrate, wherein the reflective layer comprises a plurality of reflective microstructures, the plurality of reflective microstructures respectively have a plurality of reflective surfaces, and at least a part of the plurality of reflective surfaces are inclined relative to the second substrate.

7. The convex display as recited in claim 6, wherein the second substrate, the display medium and the first substrate are sequentially stacked in a first direction; the second substrate has a second convex surface; the second convex surface has a second vertex and has a third edge and a fourth edge respectively located at two opposite sides of the second vertex; and the plurality of reflective microstructures comprise:

a plurality of first reflective microstructures located between the third edge and the second vertex, wherein each of the plurality of first reflective microstructures has a first reflective surface, and the first reflective surface faces towards a center of the convex display; and a plurality of second reflective microstructures located between the fourth edge and the second vertex, wherein each of the plurality of second reflective microstructures has a second reflective surface, and the second reflective surface faces towards the center of the convex display.

8. The convex display as recited in claim 7, wherein the first reflective surface and the second substrate include an angle $\beta 1$, and the angle $\beta 1$ is increased as the first reflective microstructure is away from the second vertex; the second reflective surface and the second substrate include an angle $\beta 2$, and the angle $\beta 2$ is increased as the second reflective microstructure is away from the second vertex.

9. The convex display as recited in claim 7, wherein the plurality of reflective microstructures further comprise:

a plurality of third reflective microstructures located in a region where the second vertex is located, wherein each of the plurality of third reflective microstructures has a third reflective surface, and the third reflective surface is substantially parallel to the second substrate.

10. The convex display as recited in claim 7, wherein a distribution density of the plurality of reflective microstructures in a region away from the second vertex is greater than a distribution density of the plurality of reflective microstructures in a region close to the second vertex.

11. The convex display as recited in claim 7, wherein the plurality of reflective microstructures are not disposed in a region close to the second vertex.

* * * * *